(12) United States Patent
Kuang et al.

(10) Patent No.: US 12,408,181 B2
(45) Date of Patent: *Sep. 2, 2025

(54) TRANSCEIVER DEVICE AND SCHEDULING DEVICE

(71) Applicant: Panasonic Intellectual Property Corporation of America, Torrance, CA (US)

(72) Inventors: Quan Kuang, Frankfurt (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,234

(22) Filed: Apr. 12, 2024

(65) Prior Publication Data

US 2024/0284468 A1    Aug. 22, 2024

Related U.S. Application Data

(63) Continuation of application No. 17/370,866, filed on Jul. 8, 2021, now Pat. No. 11,985,682, which is a
(Continued)

(30) Foreign Application Priority Data

Jan. 10, 2019    (EP) ..................... 19151281

(51) Int. Cl.
*H04W 72/23*    (2023.01)
*H04W 72/044*    (2023.01)

(52) U.S. Cl.
CPC ......... *H04W 72/23* (2023.01); *H04W 72/044* (2013.01)

(58) Field of Classification Search
CPC ............... H04W 72/044; H04W 16/14; H04W 72/0446; H04W 72/20; H04W 74/002; H04L 5/0007; H04L 5/0044
See application file for complete search history.

(56) References Cited

U.S. PATENT DOCUMENTS 10,455,488 B1 * 10/2019 Bendlin ................ H04W 16/14
2015/0207605 A1    7/2015 Jöngren et al.
(Continued)

FOREIGN PATENT DOCUMENTS

CN    108184268 A    6/2018
RU    2562407 C2    9/2015
(Continued)

OTHER PUBLICATIONS

3GPP TR 38.889 V1.0.0, "3rd Generation Partnership Project; Technical Specification Group Radio Access Network; Study on NR-based Access to Unlicensed Spectrum; (Release 16)," Nov. 2018, 120 pages.
(Continued)

*Primary Examiner* — Yee F Lam
(74) *Attorney, Agent, or Firm* — Seed Intellectual Property Law Group LLP

(57) ABSTRACT

The present disclosure provides a transceiver device and scheduling device, and communication methods for transceiver device and scheduling device. The transceiver device comprises a transceiver which, in operation, receives a physical downlink control channel (PDCCH), indicating a frequency range included in a carrier and applicable for transmission to be performed between the transceiver device and a scheduling device and a slot format indicating a sequence of symbol types by which the transmission is to be performed on a plurality of symbols included in a slot on the frequency range, the symbol types including at least one of an uplink symbol type, a downlink symbol type, and a
(Continued)

flexible symbol type, and circuitry which, in operation, determines, based on the PDCCH, the frequency range and the slot format. The transceiver, in operation, performs the transmission on the frequency range in compliance with the slot format.

6 Claims, 7 Drawing Sheets

Related U.S. Application Data continuation of application No. PCT/EP2019/083677, filed on Dec. 4, 2019.

(56) References Cited

U.S. PATENT DOCUMENTS

| | | | | |
|---|---|---|---|---|
| 2017/0280475 | A1* | 9/2017 | Yerramalli | H04W 72/56 |
| 2017/0367046 | A1 | 12/2017 | Papasakellariou | |
| 2018/0115347 | A1* | 4/2018 | Yerramalli | H04W 74/004 |
| 2018/0309513 | A1 | 10/2018 | Kim et al. | |
| 2018/0324770 | A1 | 11/2018 | Nogami et al. | |
| 2018/0367289 | A1 | 12/2018 | Kim et al. | |
| 2018/0376476 | A1 | 12/2018 | Lee et al. | |
| 2019/0059084 | A1* | 2/2019 | Lee | H04L 5/0007 |
| 2019/0222380 | A1 | 7/2019 | Manolakos et al. | |
| 2019/0230689 | A1 | 7/2019 | Cao et al. | |
| 2019/0245648 | A1 | 8/2019 | Jo et al. | |
| 2019/0305923 | A1 | 10/2019 | Luo et al. | |
| 2019/0313383 | A1 | 10/2019 | Xiong et al. | |
| 2019/0349904 | A1 | 11/2019 | Kwak et al. | |
| 2020/0092861 | A1* | 3/2020 | Xu | H04W 72/23 |
| 2020/0120680 | A1* | 4/2020 | Hwang | H04L 1/00 |
| 2020/0177341 | A1 | 6/2020 | Li et al. | |
| 2020/0314810 | A1 | 10/2020 | Tsai et al. | |
| 2021/0076418 | A1* | 3/2021 | Schober | H04W 76/11 |

FOREIGN PATENT DOCUMENTS

| | | |
|---|---|---|
| WO | WO 2018082025 A1 | 5/2018 |
| WO | WO 2018174653 A1 | 9/2018 |
| WO | WO 2018226054 A1 | 12/2018 |

OTHER PUBLICATIONS

3GPP TS 38.211 V15.3.0, "3rd Generation Partnership Project; Technical Specification Group Radio Access Network; NR; Physical channels and modulation (Release 15)," Sep. 2018, 96 pages.
3GPP TS 38.213 V15.3.0, "3rd Generation Partnership Project; Technical Specification Group Radio Access Network; NR; Physical layer procedures for control (Release 15)," Sep. 2018, 101 pages.
English translation of Russian Office Action, dated Feb. 7, 2023, for Russian Patent Application No. 2021109074/07(019612). (10 pages).
ETSI EN 301 893 V2.1.1, "5 GHz RLAN; Harmonised Standard covering the essential requirements of article 3.2 of Directive 2014/53/EU," May 2017, 122 pages.
Extended European Search Report, dated Jul. 12, 2019, for corresponding European Application No. 19151281.3, 11 pages.
Huawei, HiSilicon, "NR numerology and frame structure for unlicensed bands," R1-1813903, Agenda Item: 7.2.2.2, 3GPP TSG RAN WG1 Meeting #95, Spokane, USA, Nov. 12-16, 2018, 14 pages.
International Search Report, mailed Jan. 3, 2020, for corresponding International Application No. PCT/EP2019/083677, 3 pages.
Office Action, issued Dec. 12, 2022, for Indian Application No. 202147030264. (7 pages).
Panasonic, "Wideband operation in NR unlicensed," R1-1811095, Agenda Item: 7.2.2.2, 3GPP TSG-RAN WG1 Meeting #94bis, Chengdu, China, Oct. 8-12, 2018, 4 pages.
Qualcomm Incorporated, "DL signals and channels for NR-U," R1-1813411, Agenda Item: 7.2.2.3.1, 3GPP TSG RAN WG1 Meeting #95, Spokane, USA, Nov. 12-16, 2018, 8 pages.
Office Action, dated May 26, 2025, for Korean Patent Application No. 2021-7021490. (10 pages) (with English Translation).
Sharp, "Frame structures for NR unlicensed operation," R1-1813203, Agenda Item: 7.2.2.2, 3GPP TSG RAN WG1 Meeting #95, Spokane, USA, Nov. 12-16, 2018. (8 pages).

* cited by examiner

TRANSCEIVER DEVICE AND SCHEDULING DEVICE

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in spectrum ranging from sub-1 GHz to millimeter wave bands. The NR is a follower of the technology represented by Long Term Evolution (LTE) and LTE Advanced (LTE-A).

For systems like LTE, LTE-A, and NR, further modifications and options may facilitate efficient operation of the communication system as well as particular devices pertaining to the system.

BRIEF SUMMARY

One non-limiting and exemplary embodiment facilitates flexible allocation of resources in an unlicensed carrier.

In an embodiment, the techniques disclosed herein feature a transceiver device comprising a transceiver which, in operation, receives a physical downlink control channel, PDCCH, indicating a frequency range which is included in a carrier and applicable for transmission to be performed between the transceiver device and a scheduling device and a slot format indicating a sequence of symbol types in compliance with which the transmission is to be performed on a plurality of symbols included in a slot on the frequency range, the symbol types including at least one of an uplink symbol type, a downlink symbol type, and a flexible symbol type. The transceiver device comprises circuitry which, in operation, determines, based on the received PDCCH, the frequency range and the slot format. The transceiver, in operation, performs the transmission on the determined frequency range in compliance with the determined slot format.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

DETAILED DESCRIPTION

Figure 1:
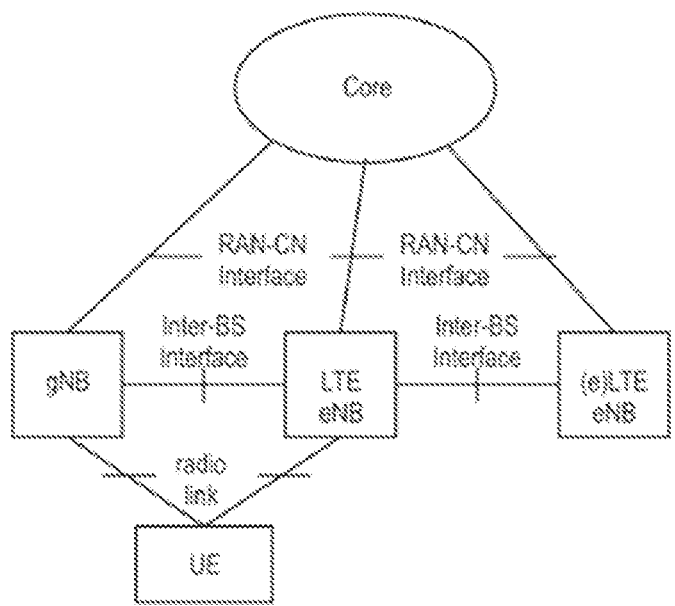
FIG. 1 shows an exemplary architecture for a 3GPP NR system including exemplary user and control plane architecture for the LTE eNB, gNB, and UE.

FIG. 1 shows an exemplary example of a communication system including a base station and a terminal and a core network. Such communication system may be a 3GPP system such as NR and/or LTE and/or UMTS. For example, as illustrated in FIG. 1, the base station (BS) may be a gNB (gNodeB, e.g., an NR base station) or an eNB (eNodeB, e.g., an LTE base station). However, the present disclosure is not limited to these 3GPP systems or to any other systems. Even though the embodiments and exemplary implementations are described using some terminology of 3GPP systems, the present disclosure is also applicable to any other communication systems, and in particular in any cellular, wireless and/or mobile systems.

The NR is planned to facilitate providing a single technical framework addressing several usage scenarios, requirements and deployment scenarios defined including, for instance, enhanced mobile broadband (eMBB), ultra-reliable low-latency communications (URLLC), massive machine type communication (mMTC), and the like. For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks. The services eMBB and URLLC are similar in that they both demand a very broad bandwidth, however are different in that the URLLC service requires ultra-low latencies. In NR, the physical layer is based on time-frequency resources (such as Orthogonal Frequency Division Multiplexing, OFDM, similar to LTE) and may support multiple antenna operation.

A terminal is referred to in the LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node, e.g., forming a part of the network for providing services to terminals. A base station is a network node, which provides wireless access to terminals.

In 3GPP, NR-based operation in an unlicensed spectrum (NR-U) is studied (see, e.g., 3GPP TR 38.889, Study on NR-based access to unlicensed spectrum, v1.0.0). NR-U may operate in a sub-7 GHz band at 5 GHz or 6 GHz. However, the present disclosure is not restricted to a particular band and may also be applied to a millimeter wave band at, e.g., 52 GHz.

Figure 2:
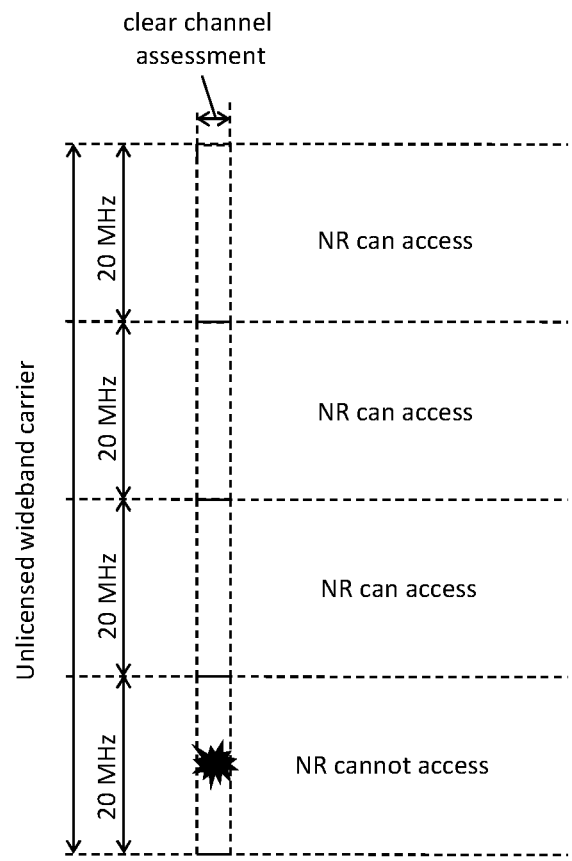
FIG. 2 is a schematic drawing showing clear channel assessment in an unlicensed wideband carrier.

Wideband operation in unlicensed spectrum is one of the building blocks for NR-U. For instance, NR-U may support the possibility to configure a serving cell with a bandwidth (within an unlicensed wideband carrier) which is larger than 20 MHz (see. FIG. 2). Moreover, if absence of transmissions by other radio access technologies (RATs) such as Wi-Fi cannot be guaranteed in the band where NR-U is operating, the NR-U operating bandwidth may be taken selected as a multiple of 20 MHz, such as 80 MHz shown in FIG. 2. Moreover, at least for a band where it is not possible to guarantee, e.g., by regulation, the absence of Wi-Fi or other competing systems, clear channel assessment, e.g., LBT (listen before talk) may be performed in units or frequency ranges of 20 MHz, as shown in FIG. 2.

The LBT procedure is defined as a mechanism by which an equipment applies a clear channel assessment (CCA) check before using the channel. The CCA utilizes at least energy detection to determine the presence or absence of other signals on a channel in order to determine if a channel is occupied or clear, respectively. European and Japanese regulations, for instance, mandate the usage of LBT in the unlicensed bands. Apart from regulatory requirements, this carrier sensing via LBT is one way for fair sharing of the unlicensed spectrum, and hence it is considered to be a vital feature for fair and friendly operation in the unlicensed spectrum in a single global solution framework.

The channel is considered occupied if the detected energy level exceeds a configured CCA threshold (e.g., for Europe, −73 dBm/MHz, see ETSI 301 893, under clause 4.8.3), and conversely is considered to be free if the detected power level is below the configured CCA threshold. If the channel is classified as free, the device is allowed to transmit immediately. The maximum transmit duration is restricted in order to facilitate fair resource sharing with other devices operating on the same band.

As can be seen in FIG. 2, as a result of LBT clear channel assessment per respective 20 MHz frequency range, it can happen that some parts of the wideband carrier are blocked by Wi-Fi or other competing systems, but NR can nevertheless still use the free parts not used by the competing RAT(s).

Figure 3:
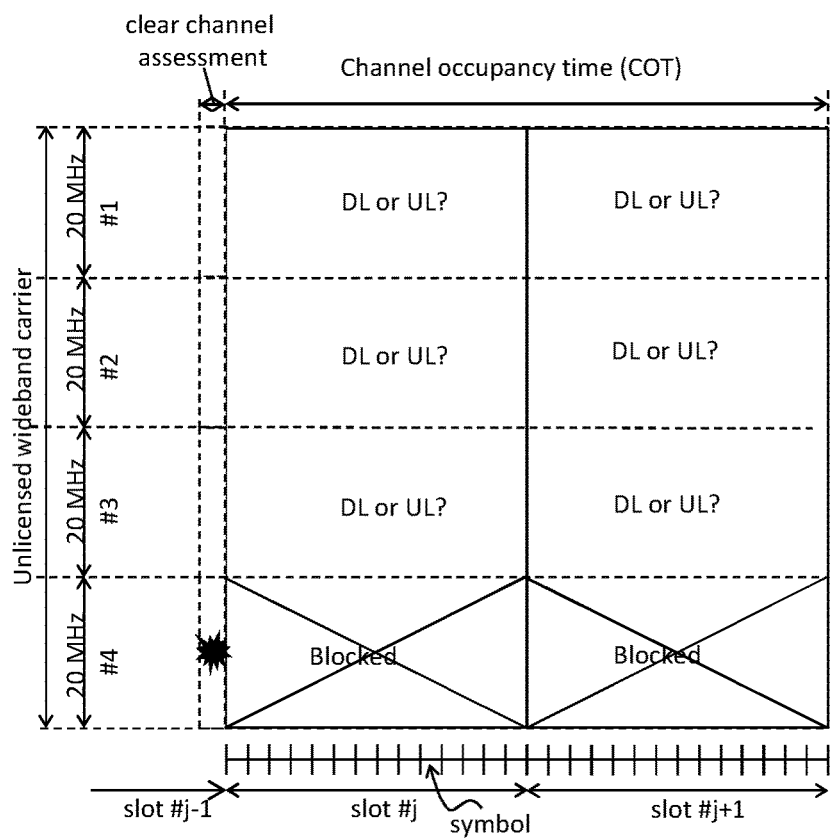
FIG. 3 is a schematic drawing showing channel occupation after clear channel assessment.

In unlicensed band operation, after acquiring the channel by LBT, an initiating device (e.g., a scheduling device such as an NR gNB) can occupy the channel up to a maximum channel occupancy time (COT). This is shown in FIG. 3

The initiating device (e.g., gNB) may share the acquired time-frequency resources with responding devices (e.g., one or more transceiver devices such as UEs). Sharing the acquired time-frequency resources may facilitate allowing flexible resource usage among uplink (UL) and downlink (DL) (see FIG. 3). For instance, DL and UL resources can be re-allocated based on the traffic demand in the respective directions.

Moreover, the sharing of the acquired resources may facilitate allowing UL transmission without performing LBT in the gNB's acquired COT. In particular, if the gap between UL and downlink transmissions is sufficiently small (e.g., less than 16 µs), no LBT needs to be performed by a UE for UL transmission directly following the DL burst, and LBT overhead may thus be reduced.

In addition, semi-statically configured or periodic reference signals, signaling, or data transmission can be made possible by sharing the acquired time-frequency resources. E.g., if semi-statically configured UL transmission configured by higher layers was within the gNB's COT, but no UL resources were shared by the gNB, then UL transmission would need to be dropped.

In FIG. 3, a COT stretching over 2 slots is merely shown for explanation. For instance, a maximum COT may be assumed to be 8 ms or 9 ms. E.g., for a subcarrier spacing of 15 kHz, a COT of 8 ms corresponds to 8 slots, and for a subcarrier spacing of 30 kHz, it corresponds to 16 slots. Moreover, in the example shown in FIG. 3, clear channel assessment is performed at the end of a slot (#j−1), and the COT starts with the first symbol of the slot preceding the slot in which the clear channel assessment is performed. However, different opportunities or time instances may be considered at which an initiating device may acquire the channel. E.g., opportunities may be at every second symbol or twice per slot.

To enable resource sharing, it is necessary for the responding device to know the available time-frequency resources to receive or transmit before obtaining dynamic scheduling. Reasons for this necessity include:

The responding device may need to filter out the interference outside the reception or transmission bandwidth (e.g., in a portion of the bandwidth used by a competing system). The importance of the filtering out of interfering transmissions depends on the type of intended transmission and may be particularly great for uplink transmissions. For the DL data reception and UL data transmission, UE needs to filter out interference in order to receive the dynamic scheduling information. Additionally, for UL, some UE may need to re-adjust its filter in order to control, e.g., in-carrier leakage.

For semi-static configured transmission or reception such as SSB (synchronization signal block), periodic CSI-RS (channel state information reference signal), PRACH (physical random access channel), configured grant type-1 UL transmission, no dynamic scheduling is provided. Therefore, the responding device needs to know whether the semi-statically configured resources are still available within the COT.

Knowing the available transmission or reception bandwidth may facilitate simplifying the resource allocation scheme in dynamic scheduling. For instance, less information on the transmission or reception bandwidth needs to be signaled in the scheduling information.

The present disclosure provides techniques by which may facilitate for the initiating device to signal the available time-frequency resources to the responding device for the acquired COT in NR-U. In particular, as described in the following, reuse of a design based on slot format of NR is considered.

In slot-based scheduling, a slot corresponds to the timing granularity (TTI-transmission time interval) for scheduling assignment. In general, TTI determines the timing granularity for scheduling assignment. One TTI is the time interval in which given signals is mapped to the physical layer. For instance, conventionally, the TTI length can vary from 14-symbols (slot-based scheduling) to 2-symbols (non-slot based scheduling). Downlink and uplink transmissions are specified to be organized into frames (10 ms duration) consisting of 10 subframes (1 ms duration). In slot-based transmission, a subframe, in return, is divided into slots, the number of slots being defined by the numerology/subcarrier spacing. The specified values range between 10 slots per frame (1 slot per subframe) for a subcarrier spacing of 15 kHz to 320 slots per frame (32 slots per subframe) for a subcarrier spacing of 240 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.3.0, Physical channels and modulation, 2018-09). However, assignment of time resources for transmission may also be non-slot based. In particular, the TTIs in non slot-based assignment may correspond to mini-slots rather than slots. I.e., one or more mini-slots may be assign to a requested transmission of data/control signaling. In non slot-based assignment, the minimum length of a TTI may conventionally be 2 OFDM symbols.

In Release 15 of NR, slot format is used to configure DL symbols (D), UL symbols (U), and flexible symbols (F). In particular, if a UE is configured by higher layers with parameter SlotFormatIndicator, the UE is provided with a SFI-RNTI (slot format indicator—radio network temporary identifier) by higher layer parameter sfi-RNTI and with a payload size of DCI format 2_0 by higher layer parameter dci-PayloadSize. (see, e.g., 3GPP TS 38.213 V15.3.0, Physical layer procedures for control (Release 15), 2018-09, sections 11, 11.1, 11.1.1 which in its entirety is incorporated herein by reference, but not the opinions or conclusions reached therein).

Accordingly, a UE determines a slot format based on jointly semi-static RRC (Radio Resource Control) configuration of slot format and dynamic SFI-PDCCH (slot format indicator-physical downlink control channel, DCI format 2_0 with CRC scrambled by SFI-RNTI) with the following rule shown in Table 1:

TABLE 1

Joint RRC-based and PDCCH based determination of slot format

| Symbol indicated by semi-static | Symbol indicated by dynamic slot format (SFI-PDCCH) | | |
|---|---|---|---|
| Slot format | D | U | F |
| D | allowed | Not allowed | Not allowed |
| U | Not allowed | allowed | Not allowed |
| F | allowed | allowed | allowed |

In particular, a slot format indicates for symbols (e.g., all symbols) included in a slot or a few consecutive slots respective symbol types (UL, DL, flexible). E.g., a UE is configured semi-statically for slot #j with format "DDDDFFFFFFFFFF," and then SFI-PDCCH can dynamically indicate "DDDDFFUUUUUUUU" if gNB wants to allocate some symbols (in particular, symbols configured as flexible) for UL. The above described Release-15 NR slot format applies to the whole serving sell. For instance, if "D" is (semi-statically or dynamically) indicated in a slot, it applies to the whole wideband carrier.

As mentioned above, sharing the acquired time-frequency resources may facilitate allowing flexible resource usage UL and DL in NR-U. In order to allow for dynamically changing the slot format by PDCCH, one may semi-statically configure all symbols of a slot or a few consecutive slots as flexible (which may be considered to practically correspond to providing no actual semi-static slot format configuration at all).

As also mentioned above, the Release-15 NR slot format applies to the whole serving cell. Therefore, it is suitable in scenarios where the NR-U is operating in a relatively narrow band such as 20 MHz carrier bandwidth. It is also suitable in scenarios where the partial access of the wideband carrier is not allowed, e.g., in a wideband carrier of 80 MHz bandwidth, the NR-U operation can either use the whole carrier if it is free from LBT, or none of it if any 20 MHz LBT sub-band is blocked by other system.

To enhance wideband operation, in the embodiments of communication methods and communication devices described in the following, the initiating device (scheduling device) indicates the slot format (which defines DL, UL, and flexible symbols) together with its associated applicable frequency range(s) by PDCCH. Accordingly, supporting the partial carrier access to the wideband carrier as shown in FIG. 2 can be facilitated.

Figure 4:
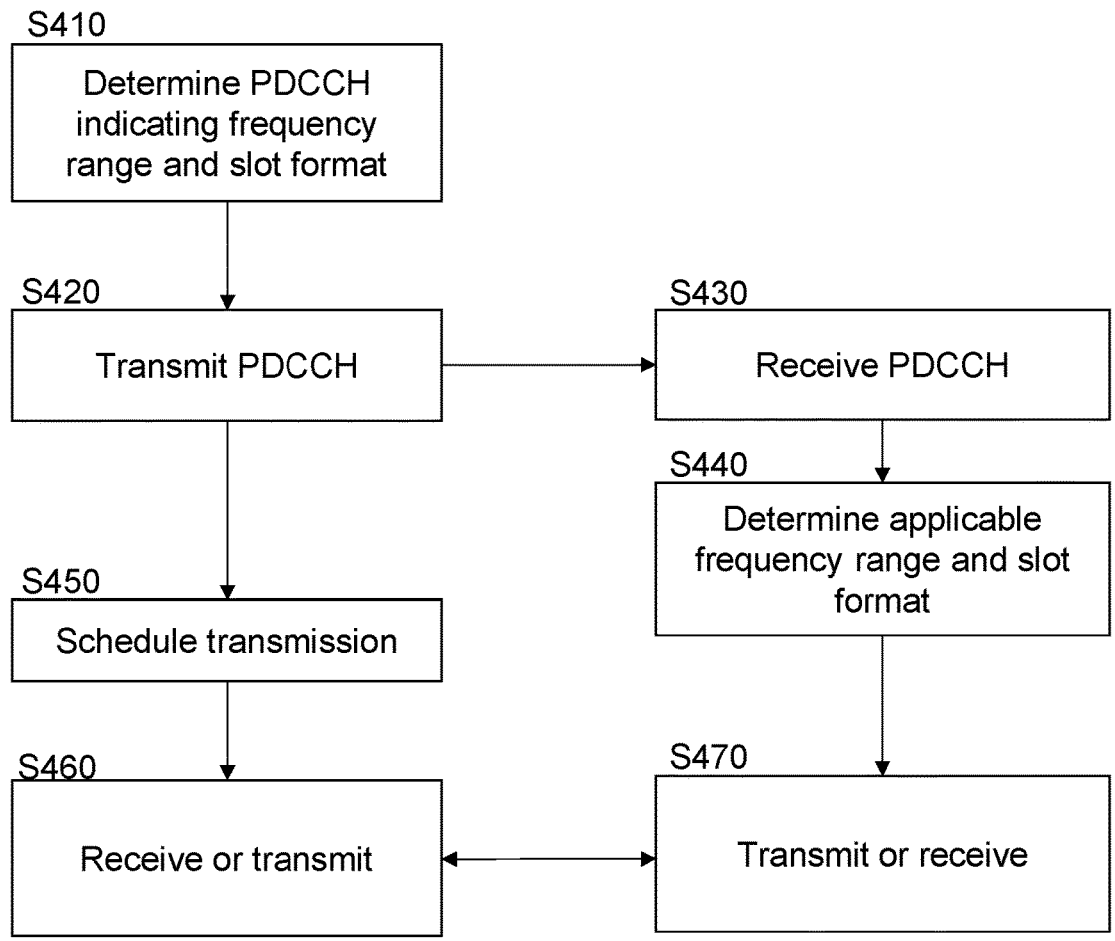
FIG. 4 is a flow chart showing communication methods for a scheduling device and a transceiver device.

The disclosure provides a communication method for a transceiver device shown in FIG. 4. The method comprises steps of receiving S430 a PDCCH (physical downlink control channel) indicating an applicable frequency range and a slot format, determining S440 the applicable frequency range and the slot format based on the received PDCCH, and performing S470 a transmission (transmitting (UL) or receiving (DL)) on the applicable frequency range in compliance with the slot format.

Figure 5:
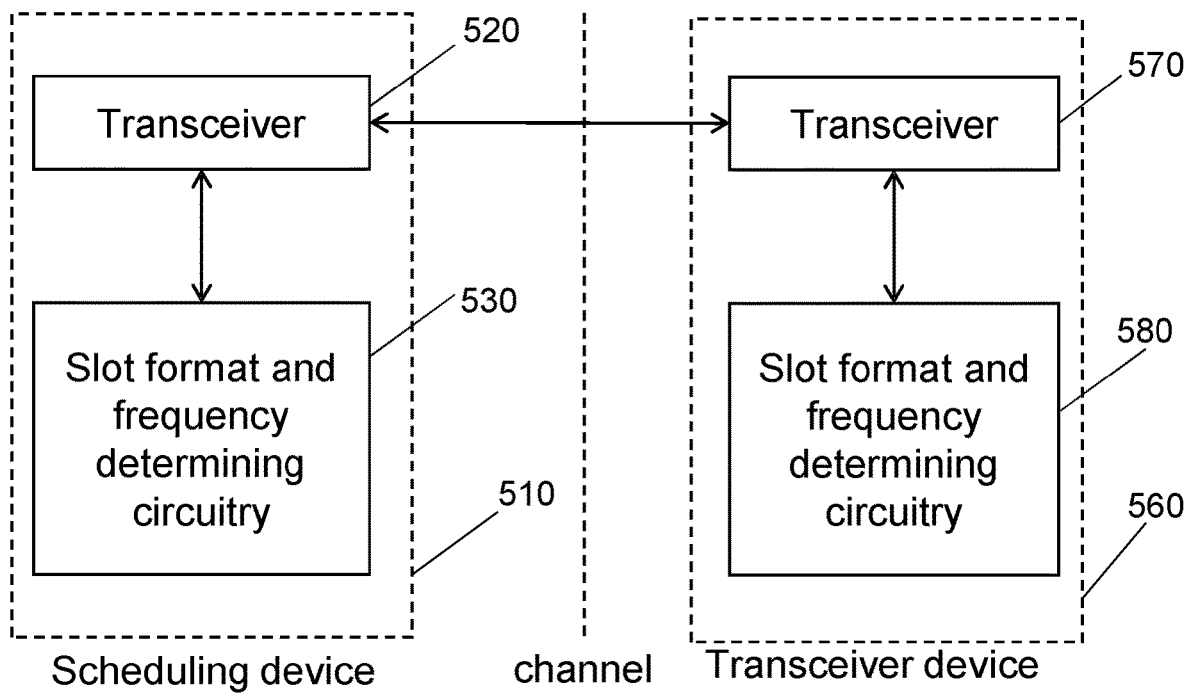
FIG. 5 is a block diagram showing a scheduling device and a transceiver device.
Figures 6, 7:
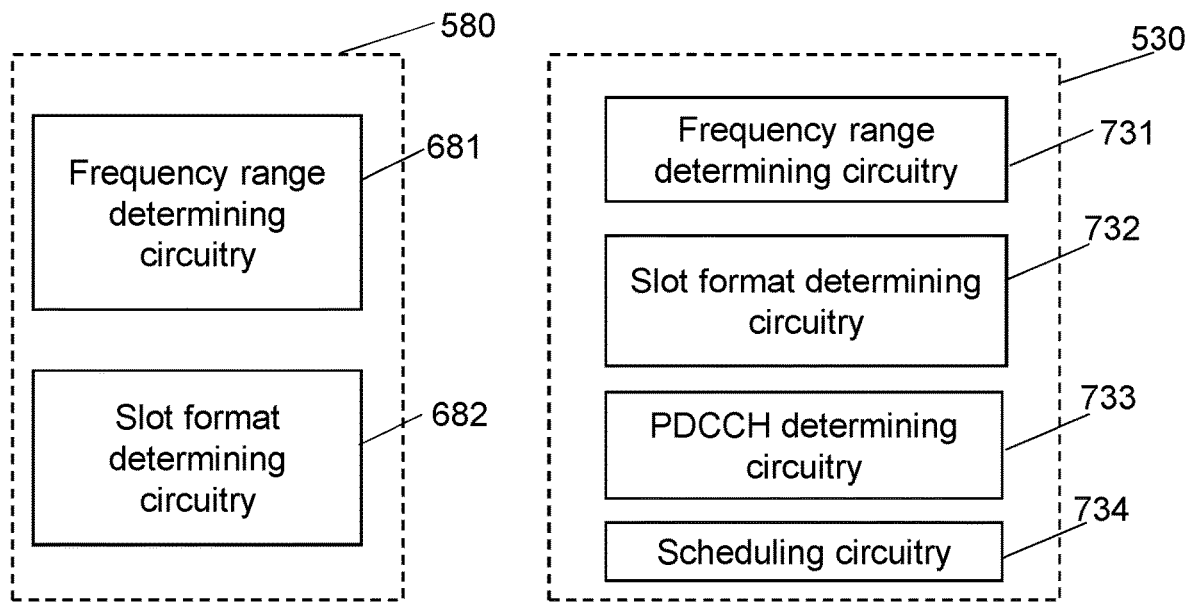
FIG. 6 is a block diagram showing processing circuitry of a transceiver device
FIG. 7 is a block diagram showing processing circuitry of a scheduling device.

In correspondence with the above communication method for a transceiver device, provided is a transceiver device 560, as shown in FIG. 5. The transceiver device 560 comprises a transceiver 570 (a transmitter receiver comprising hardware component(s) such as one or more antennas and control circuitry which controls operation of the hardware components) which, in operation, receives a PDCCH indicating an applicable frequency range and a slot format, and circuitry 580 (or processing circuitry) which, in operation, determines the applicable frequency range and slot format based on the PDCCH. The transceiver 570, in operation, performs the (UL or DL) transmission (transmits (UL)/receives (DL)). For instance, the transceiver device is a UE of NR. Accordingly, the transceiver 570 and circuitry 580 are also referred to in this disclosure as "UE transceiver" and "UE circuitry." However, these terms are merely used to distinguish the circuitry 580 and transceiver 570 from circuitry and transceiver(s) comprised by other devices such as base stations. The transceiver device 560 may be a terminal device or communication device of a similar communication system. The UE circuitry 580 (which may be considered "slot format and frequency determining circuitry") is shown in FIG. 6, comprising frequency range determining circuitry 681 and slot format determining circuitry 682.

Further provided is a communication method for a scheduling device (or scheduling node). As also shown in FIG. 4, the method for the scheduling device comprises the steps of determining S410 a PDCCH indicating an applicable frequency range and a slot format, transmitting S420 the PDCCH, and scheduling S450 and performing S460 a transmission (receiving (UL) or transmitting (DL)) on the applicable frequency range in compliance with the slot format.

In correspondence with the method for the scheduling device, provided is a scheduling device 510 (or scheduling node) shown in FIG. 5, comprising circuitry 530 which, in operation, determines the PDCCH indicating an applicable frequency range and a slot format, and a transceiver 520 which, in operation, transmits the PDCCH. The circuitry 530, in operation, schedules the transmission and the transceiver 520, in operation, performs the transmission (receives (UL) or transmits (DL)) on the applicable frequency range indicated by the PDCCH in compliance with the slot format indicated by the PDCCH. For instance, the scheduling device is a network node (base station) in an NR system (a gNB) or in a similar wireless communication system. The circuitry 530 is also referred to as "slot format determining circuitry" or, to distinguish it from other circuitry such as the UE circuitry 580, "network node circuitry." The network node circuitry 530 shown in FIG. 7 comprises frequency range determining circuitry 731, slot format determining circuitry 732, PDCCH determining circuitry 733, and scheduling circuitry 734.

In the further description, the details and embodiments apply to each of the transceiver device 560, the scheduling node (or scheduling device) 510, and the respective methods for the transceiver device and scheduling node unless explicit statement or the context indicates otherwise.

The scheduling node 510 transmits the PDCCH to the transceiver device 560. The applicable frequency range indicated by the PDCCH is an applicable frequency range which is included in a carrier and applicable for transmission to be performed between the transceiver device and a scheduling device. The carrier may be an unlicensed carrier (or unlicensed wideband carrier). The PDCCH indicates one or more applicable frequency ranges of the carrier. These applicable frequency ranges are frequency ranges ((sub-)intervals, sub-bands, or partitions) within the unlicensed carrier which are not used by a competing RAT system (e.g., Wi-Fi) for the duration of a slot or a COT comprising a plurality of slots. The partitions of the unlicensed carrier (or the bandwidth within the unlicensed carrier where NR-U is operating) may respectively have an equal width. For instance, if the bandwidth within the carrier where the NR-U is operating is a multiple of 20 MHz, as mentioned above, the width of the frequency ranges may be 20 MHz.

The applicable frequency range is a frequency range applicable for transmission performed between the transceiver device 560 and the scheduling node 510. This transmission may be an uplink transmission from the transceiver device 560 to the scheduling node 510 (the transceiver device 560 transmits and the scheduling node 510 receives) or a downlink transmission from the scheduling node 510 to the transceiver device 560 (the scheduling node 510 transmits and the transceiver device 560 receives). Transceiver device 560 and scheduling node 510 communicate with each other via a wireless channel, in particular a channel in an unlicensed frequency band/carrier.

The slot format indicates a sequence of symbol types in compliance with which the transmission is to be performed on a plurality of symbols included in a slot (e.g., 14 symbols in a slot) or a few consecutive slots on the applicable frequency range. Accordingly, a slot format assigns a symbol type to each symbol in a slot or a few consecutive slots. Therein, the symbol types include an uplink symbol type, a downlink symbol type, and a flexible symbol type. Exemplary slot formats for normal cyclic prefix (a slot having 14 symbols) are "DDFFFFFFFFFFUUU" (slot format 26) and "DDFFUUUUUUUUUU" (slot format 38). For the slot formats for normal cyclic prefix, see also Table 11.1.1-1 in 3GPP TS 38.213 V15.3.0, Physical layer procedures for control (Release 15), 2018-09, section 11.1.1).

The PDCCH indicates the slot format by an indicator (e.g., a dedicated bit field) in a DCI carried by the PDCCH. The DCI format may be the above mentioned DCI-format 2_0 or a similar format, modified in that it indicates, in addition to the slot format, the applicable frequency range. The applicable frequency range may alternatively be indicated by a different DCI than the slot format. Each slot format may be mapped to or provided with an index in accordance with a (statically and/or semi-statically configured) table or mapping. The indicator in the PDCCH represents an index of a respective corresponding slot format from the configuration. Alternatively, the indicator can contain a bitmap to indicate the type of each symbol individually. In the alternative method, no static or semi-static table is needed. However, the signaling overhead would be increased.

Regarding the indication of the applicable frequency ranges, the present disclosure provides explicit and implicit indication by the PDCCH, as will be further described.

The scheduling node 510 schedules the transmission. In particular, the scheduling node 510 generates control information and transmits the control information including scheduling information for the transmission (a scheduling grant for UL or scheduling assignment for DL), and transmits the control information to the transceiver device 560 which receives the control information including the scheduling grant. For instance, control information including the (UL) scheduling grant or (DL) scheduling assignment is transmitted on a channel different from said (first) PDCCH carrying the indication of the applicable frequency range(s) and the slot format. E.g., the scheduling grant may be dynamically signaled and included in a (second) PDCCH different from said PDCCH, or may be semi-statically signaled. The (UL or DL) transmission is performed on the applicable frequency range in compliance with the determined slot format indicated by the first PDCCH and according to the transmitted (scheduling device 510) and received (transceiver device 560) control information included in the channel different from said first PDCCH.

The UL or DL transmission performed in the applicable frequency range may be a transmission of data, control information, or reference signals. For instance, the transmission includes at least one of the following types of transmission:

periodic uplink transmission performed on a symbol specified by the slot format indicated by the PDCCH as uplink, periodic downlink transmission performed on a symbol specified by the slot format indicated by the PDCCH as downlink, semi-statically configured uplink transmission performed on a symbol specified by the slot format indicated by the PDCCH as uplink, semi-statically configured downlink transmission performed on a symbol specified by the slot format indicated by the PDCCH as downlink, dynamic uplink transmission performed on a symbol specified by the slot format indicated by the PDCCH as uplink or flexible, and dynamic downlink transmission performed on a symbol specified by the slot format indicated by the PDCCH as downlink or flexible.

Therein, semi-statically configured transmissions are transmissions that are configured less frequently than dynamically (e.g., by a DCI) scheduled transmissions. Further, it should be noted that a semi-statically configured transmission may, but need not necessarily, be at the same time periodic. In particular, on the one hand, some semi-statically configured transmissions may not be actually performed periodically, for example PRACH (physical random access channel). The resources of PRACH are configured semi-statically (and it the PRACH resources are periodic in time). However, the actual PRACH transmission depends on the need, it need not happen periodically. On the other hand, other semi-statically configured signals such as SSB (synchronization resource block), periodic CSI-RS (channel state information reference signals)), or periodic SRS (sounding reference signals, are transmitted periodically.

As mentioned, the carrier including the applicable frequency ranges may be an unlicensed carrier. E.g., the carrier may be shared by a first communication system such as NR or NR-U including the scheduling device 510 and the transceiver device 560, and a second communication system such as a Wi-Fi system using the same or part of the unlicensed wideband carrier. The scheduling device 510 may further perform clear channel assessment to determine an unused frequency range (or a plurality of unused frequency ranges) currently unused by the second communication system and thus acquire the one or more unused frequency ranges for transmission(s) within a COT. For instance, the plurality of frequency ranges are a plurality of 20 MHz ranges. By acquiring the unused frequencies range(s), the scheduling device 510 may be considered to initiate communication in the unlicensed wideband carrier and may be considered an initiating device. The scheduling device then, in step S410 determines, determines the (first) PDCCH based on the result of the clear channel assessment. In particular, the scheduling device selects one or more frequency ranges from among the unused frequency ranges as the applicable frequency ranges, and determines and generates the information (DCI) to be transmitted on the PDCCH including an indication of the unused frequency ranges as the applicable frequency ranges.

For instance, the PDCCH indicating the applicable frequency range and the slot format is a group-common (GC) PDCCH which the scheduling device 510 transmits to a group of transceiver devices including transceiver device 560. Accordingly, the indicated applicable frequency range(s) and the slot format are used by group of transceiver devices. The transceiver devices from among the group may be configured (e.g., by RRC) with a group-common RNTI (radio network temporary identifier) which the scheduling device 510 uses for scrambling the DCI (i.e., the CRC bits of the DCI) carried by the GC PDCCH. The transceiver devices descramble the DCI carried by the GC PDCCH using the group-common RNTI.

GC PDCCH Indicating One Slot Format

In some embodiments, the group-common (GC) PDCCH contains one slot format, and the applicable frequency range is indicated explicitly by the GC PDCCH. For instance, the PDCCH includes a first field indicating the (applicable) frequency range and a second field indicating the slot format. Accordingly, in addition to the second field (or slot format indicator), which may be the above-described indicator of an index corresponding to the slot format, the PDCCH further carries an explicit indicator of the range (or ranges) within the (unlicensed) wideband carrier which are currently not used for communication not involving the addressed group of transceiver devices (such as communication of another communication system). For instance, the first bit field may be one of the following alternatives:

First Alternative: The applicable frequency range(s) are explicitly represented by a bitmap, where one bit in the bitmap represents an applicable range (e.g., a 20 MHz range).

Second alternative: The applicable frequency range(s) (the applicable portion of the unlicensed wideband carrier, provided it is contiguous) is represented by a starting position and a length of the applicable portion, wherein the length has a specified granularity such as 20 MHz.

In accordance with the first alternative, in some embodiments, the first field (i.e., the indicator of the applicable frequency range) is a bitmap including a plurality of bits the bits of which correspond respectively to a plurality of ranges (such as 20 MHz ranges) included in the carrier and including said applicable frequency range. The bitmap indicates whether or not a (respective) range from among the plurality of ranges is applicable for the transmission. In particular, a bit in the bitmap (or each bit in the bitmap) indicates whether or not a corresponding frequency range is applicable for the transmission to be performed in compliance with the slot format.

Figure 8:
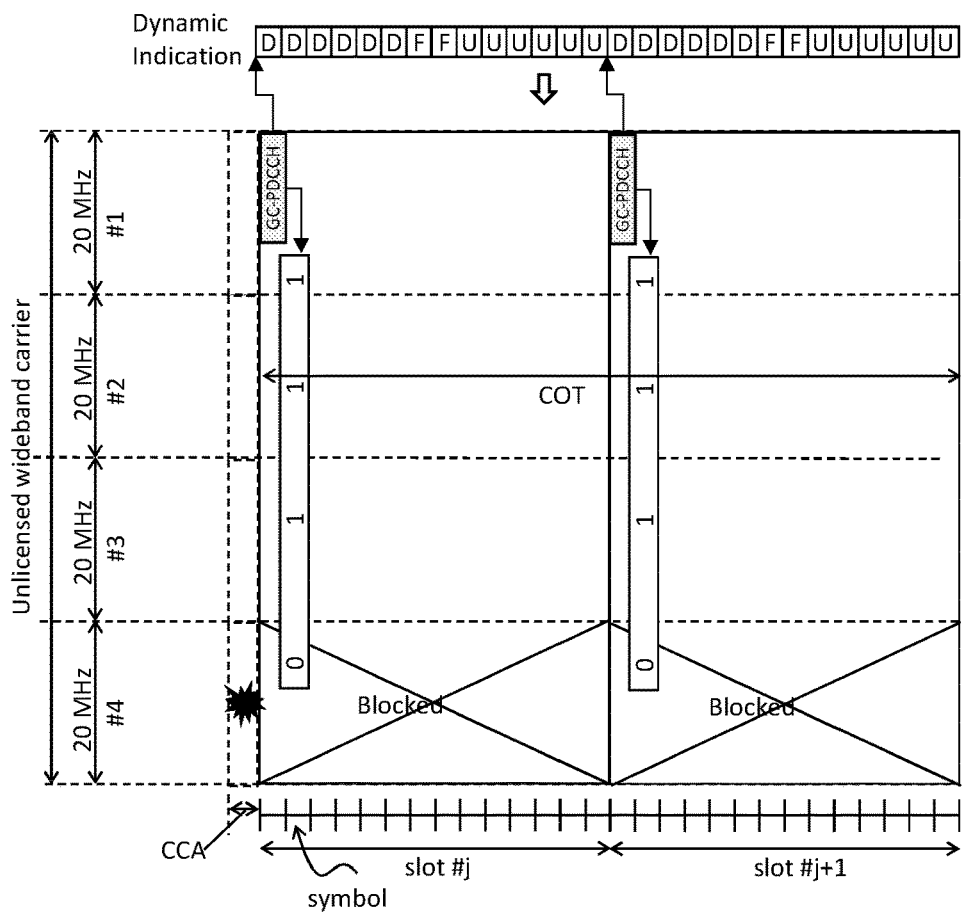
FIG. 8 is a diagram illustrating an exemplary slot format and applicable frequency ranges.

In the example shown in FIG. 8, the unlicensed wideband carrier of width 80 MHz is subdivided into four 20 MHz frequency ranges. The gNB (or similar scheduling device 510) performs clear channel assessment (LBT) to determine respectively the availability of the 20 MHz ranges. For instance, the scheduling device 510 succeeds over frequency ranges (20 MHz (sub-)bands) #1, #2, and #3, (determines ranges #1-#3 to be available) but fails for frequency range #4 (i.e., determines that frequency is blocked/used by another system/RAT and therefore not available).

The scheduling device 510 generates a bitmap which indicates the applicable frequency range in accordance with the result of the LBT, e.g., "0111." Therein, frequency range #1 is corresponds to the least significant bit. However, the disclosure is not limited thereto, and the bitmap may also, for instance, be "1110."

The scheduling device 510 then sends the GC PDCCH including the bitmap indicator of the applicable frequency range to the transceiver device or the group of transceiver devices which are to perform the communication with the scheduling device. Meanwhile, a UE (or other transceiver device 560 UE) monitors the GC PDCCH according to a search space configuration provided by RRC (for instance, as shown in FIG. 8, the search space is included in every slot in the #1 frequency range (20 MHz sub-band)). The configuration of the search space for monitoring the GC PDCCH includes both time and frequency domain configurations. In time domain, it configures the monitoring periodicity such as once per slot or multiple times per slot, and the monitoring offset indicating which symbol(s) UE should monitor. In the example given in FIG. 8, the monitoring is performed at the first symbol per slot, but this should not be regarded as the limitation of the current disclosure. In frequency domain, the configuration instructs the UE the frequency domain resources for monitoring the (GC) PDCCH. Such frequency domain resources can be located within one 20 MHz sub-band or multiple 20 MHz sub-bands. It may be determined by the scheduling device 510 in based on statistics regarding the blocking of the respective sub-bands. Accordingly the search space may be configured in a sub-band where blockage by other systems is less or least like to occur, in order to facilitate reliable reception of the GC PDCCH by the UE. If such statistics information is not available, and/or in order for the scheduling device 510 to maximize the successful rate of delivering (GC) PDCCH containing the indicator of applicable frequency range(s), the transceiver device 560 (UE) can be configured to monitor (GC) PDCCH over all 20 MHz sub-bands.

In FIG. 8, the PDCCH is comprised by the first symbol in temporal order (e.g., labeled symbol #0). Similarly in FIGS. 9 and 11 to be described further below, the GC PDCCH is shown in two or three Figures at the beginning of the slot. However, the GC PDCCH (or the search space) need not include symbols at the beginning of the slot and may also be allocated to other symbols. Furthermore, as mentioned, clear channel assessment (CCA) may be performed at the end of a previous slot or at different opportunities for acquiring the channel.

In the GC PDCCH, one slot format (e.g., "DDDDDDF-FUUUUUU") and the applicable frequency range(s) (e.g., "0111") are indicated. In accordance with the received GC PDCCH, the UE derives the transmission and/or reception bandwidth as 60 MHZ, spanning the first 3 20 MHz sub-bands/frequency ranges. Accordingly, the UE applies the slot format "DDDDDDFFUUUUUU" only to the first three 20 MHz sub-bands, and marks #4 20 MHz sub-band as inapplicable. The UE drops any RRC configured transmission or reception (e.g., PDCCH, semi-persistent scheduling (SPS) PDSCH, CSI-RS, SRS, configured grant PUSCH, PRACH) over #4 20 MHz sub-band. The UE derives at which symbols to transmit or receive according to the slot format "DDDDDDFFUUUUUU." For dynamically scheduled transmission, e.g., PDSCH scheduled by DCI format 1_1, UE interprets the frequency domain resource allocation field by assuming the available frequency range is from #1 to #3 (total 60 MHz).

Figure 9:
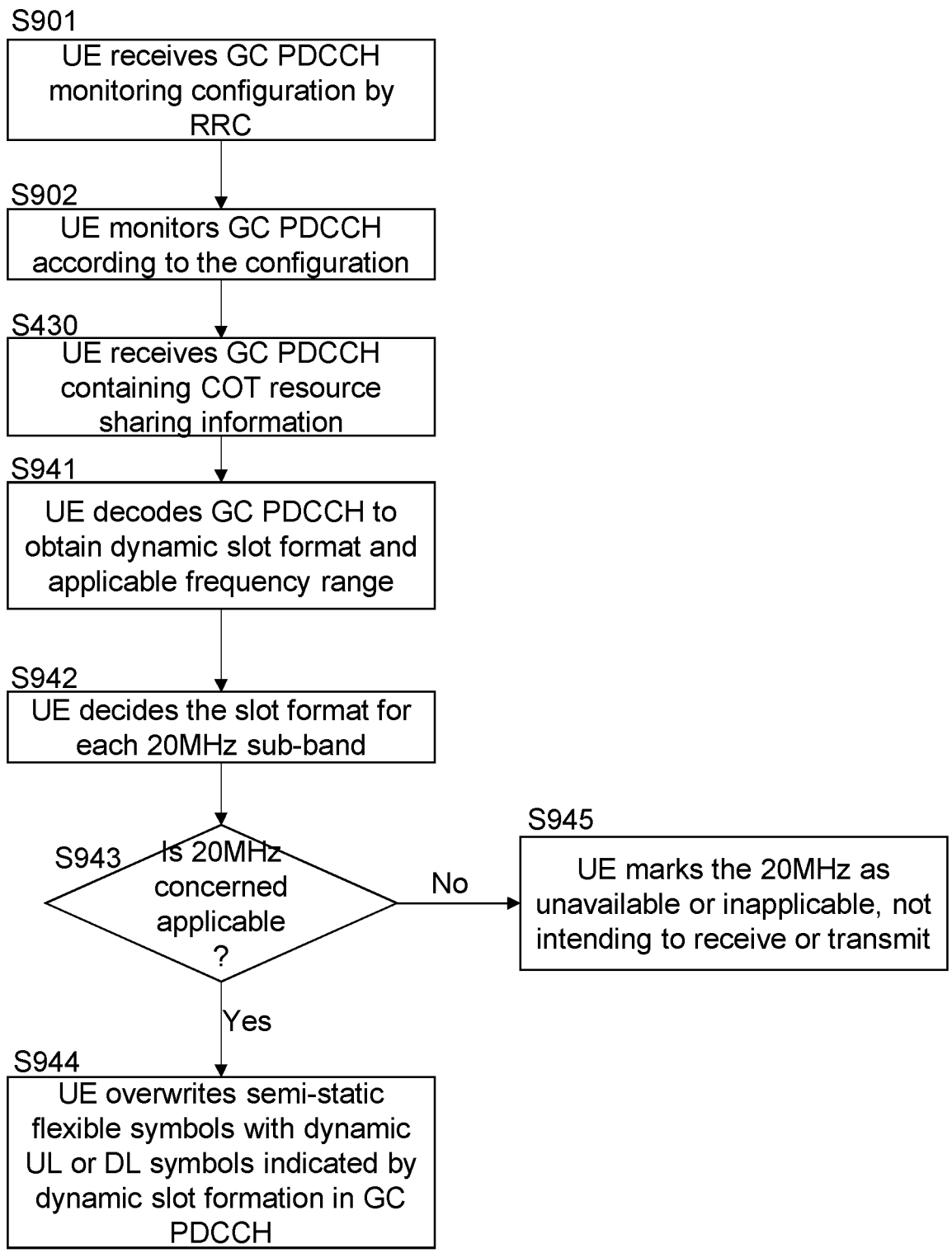
FIG. 9 is a flow chart showing exemplary for determining a slot format and an applicable frequency range in a method for a UE.

In FIG. 9, method steps performed by the UE (or transceiver device 560) are shown. In step S901, the UE receives a GC PDCCH monitoring configuration by RRC. In step S902, the UE monitors the GC PDCCH according to the configuration. In step S430 also shown in FIG. 4, the UE receives the GC PDCCH containing the COT resource sharing information. In particular, the resource sharing information includes the indicator of applicable frequency ranges and the indicator of the slot format. Steps S941 to S945 are sub-steps of step S440. In particular, In step S941, the UE decodes the GC PDCCH to obtain the dynamic slot format and the applicable frequency range(s). In steps 942 and 943, the UE decides the slot format for each 20 MHz sub-band (or sub-bands of a different width, such as 40 MHz). In particular, the UE decides or determines for each (20 MHz) sub-band/frequency range whether or not the respectively concerned frequency range is applicable. If yes, the UE overwrites symbols semi-statically configured as flexible symbols as dynamic UL or DL symbols (see Table 1) as indicated by the dynamic slot formation included in the GC PDCCH. If no, the UE marks the respective (20 MHz) frequency range as unavailable or inapplicable, not intending to receive or transmit on this unavailable frequency range.

In the above description of FIGS. 8 and 9, the applicable frequency ranges are indicated by a bit-map comprising bits corresponding to the frequency ranges in accordance with the above alternative 1. However, the availability or applicability of the frequency ranges may also be signaled (by gNB) and determined by an indicator of a starting position and a length of an applicable part of the unlicensed carrier in accordance with the second alternative.

Accordingly, in some embodiments, the applicable frequency range is included in a contiguous set of applicable frequency ranges and the first field indicates a starting position of the contiguous set of applicable frequency ranges and a length of the contiguous set of applicable frequency ranges. For instance, for the case of a 80 MHz wideband carrier subdivided into 20 MHz frequency ranges, two bits may indicate the starting position (or starting frequency range) of the set of applicable frequency ranges, and two further bits may indicate the length in units of applicable (20 MHZ) frequency ranges. In the example shown in FIG. 8, the starting position is frequency range 1 (represented by two bits, e.g., as "00"), and the length of the applicable set of ranges is 3 (represented by "10"). Such an applicable contiguous set of frequency ranges may be signaled by a bit field "0010." The case of no applicable range (the whole carrier blocked) may be indicated by an "impossible" combination such as "1111" (an applicable set of ranges of length 4 starting at frequency range position #4). The bit length can be further reduced by an alternative encoding method. In an example where the wideband carrier contains 5 20 MHz frequency ranges, the total number of combinations for the starting position and the length is 5+4+3+2+1=15. Therefore, only log 2(15)=4 bits are needed for jointly encoding. If the starting position and length are encoded separately, total 3+3=6 bits are required. To also allow for indicating the non-contiguous case, alternative 2 requires additional signaling, e.g., a first and second starting position and a first and second length.

As described above, if a certain (20 MHz) frequency range included in the unlicensed carrier is indicated as applicable (e.g., by an indicator according to the first or second alternative) the UE follows the slot format determination rule determining the slot format from both the semi-static configuration and the dynamic indication, and further obtains the scheduling information from a further channel (e.g., in a scheduling DCI if the transmission is dynamically scheduled). If a certain frequency range is indicated inapplicable, the UE neither receives nor transmits over this inapplicable frequency range even if the slot format indicates DL or UL resources or the scheduling DCI schedules resources within the inapplicable frequency range.

An overview on combinations of semi-static symbol indication (semi-static slot format), dynamic symbol indication (dynamic slot format) and (semi static or periodic) configuration or (dynamic) scheduling is provided in Tables 2 (semi-static and periodic transmission) and Table 3.

TABLE 2

UE behavior determination for semi-static or periodic transmission

| Case | Frequency domain applicability | Semi-static symbol indication | Dynamic symbol indication | Symbol configured for semi-static or periodic transmission | UE behavior |
|---|---|---|---|---|---|
| 1a | applicable | D | D | D | Receive |
| 1b |  | D | D | U | Error case |
| 1c |  | D | U or F | D or U | Error case |
| 1d |  | U | U | U | Transmit |
| 1e |  | U | U | D | Error case |
| 1f |  | U | D or F | D or U | Error case |
| 1g |  | F | D | D | Receive |
| 1h |  | F | F | D | Neither transmit nor receive |
| 1i |  | F | F | U | Neither transmit nor receive |
| 1j |  | F | U | U | Transmit |

TABLE 2-continued

UE behavior determination for semi-static or periodic transmission

| Case | Frequency domain applicability | Semi-static symbol indication | Dynamic symbol indication | Symbol configured for semi-static or periodic transmission | UE behavior |
|---|---|---|---|---|---|
| 1k | | F | D | U | Neither transmit nor receive |
| 1l | | F | U | D | Neither transmit nor receive |
| 2 | inapplicable | D or U or F | D or U or F | D or U | Neither transmit nor receive |

TABLE 3

UE behavior determination for dynamic scheduled transmission

| Case | Frequency domain applicability | Semi-static symbol indication | Dynamic symbol indication | Symbol scheduled by DCI | UE behavior |
|---|---|---|---|---|---|
| 1a | applicable | D | D | D | Receive |
| 1b | | D | D | U | Error case |
| 1c | | D | U or F | D or U | Error case |
| 1d | | U | U | U | Transmit |
| 1e | | U | U | D | Error case |
| 1f | | U | D or F | D or U | Error case |
| 1g | | F | D | D | Receive |
| 1h | | F | F | D | Receive |
| 1i | | F | F | U | Transmit |
| 1j | | F | U | U | Transmit |
| 1k | | F | D | U | Error case |
| 1l | | F | U | D | Error case |
| 2 | inapplicable | D or U or F | D or U or F | D or U | Neither transmit nor receive |

In accordance with Table 2 (cases 1a, 1g), semi-static (semi-statically configured) or periodic DL transmission is allowed over the (dynamically indicated) DL symbols within the union of applicable frequency range(s) (the "union" being the one or more frequency ranges indicated as applicable). Semi-static or periodic UL transmission is allowed over the (dynamically indicated) UL symbols within the union of applicable frequency range(s) (cases 1d, 1j).

As can further be seen from Table 3, dynamic DL transmission is allowed over DL and flexible symbols within the union of applicable frequency range(s) (cases 1a, 1g, and 1h). Dynamic UL transmission is allowed over UL and flexible symbols within the union of applicable frequency range(s). Moreover, dynamic DL/UL transmission, the frequency domain resource allocation field in scheduling DCI is interpreted only with respect to the union of applicable frequency range(s) (cases 1d, 1i, and 1j).

Moreover, for case to in Tables 2 and 3, no transmission or reception is performed by the UE irrespective of the slot format indication and dynamic scheduling or semi-static configuration in a frequency range/domain indicated as inapplicable by the indicator in the GC PDCCH.

As described above, the slot format is indicated may be indicated by means of a semi-static indication and a dynamic indication. Accordingly, in some embodiments, the slot format indicated by the (GC) PDCCH is a dynamic slot format, and the communication method further includes receiving RRC signaling including a (semi-statically) configured slot format. Moreover, as shown in Tables 2 and 3, in case the configured slot format specifies a symbol in the slot as flexible, the dynamic slot format specifies said symbol as flexible, uplink, or downlink. Accordingly, a semi static indication of a symbol as flexible can still be overruled by a dynamic "downlink" or "uplink" symbol indication and still enable a transmission, without invoking an error case, provided that the dynamic symbol indication does not contradict (e.g., UL versus DL) the (dynamic) scheduling or (semi-static) configuration.

Moreover, as described above, embodiments using an explicit indication of the applicable frequency range(s) allow for reusing or maintaining a slot format indication rule based on both semi-static and dynamic slot format indication, and limiting this indication to accessible/applicable sub-bands/frequency ranges (e.g., 20 MHz ranges). Accordingly, flexibility and reliability provided by the combined (semi-static and dynamic indication) can be applied to the case where the unlicensed carrier is only partially available. Moreover, as a single slot format indication in the GC PDCCH is sufficient, reduction or saving of PDCCH overhead may be facilitated. In addition, the above-described embodiments may facilitate simplifying the frequency resource domain allocation field in the scheduling DCI. For instance, indications regarding resources in inapplicable frequency ranges may be omitted from the scheduling DCI.

As mentioned earlier, the monitoring of the slot format indication can be RRC configured to be once per slot over the symbol(s) at the beginning of the slot. In this case, it is straightforward to apply the indication of the slot format. In other cases where the periodicity of monitoring of the slot format indication is less than one slot, such as every two symbols, after UE receive the slot format, UE would only consider the indication of the future symbol(s) and ignore the indication of the symbol(s) which has occurred before receiving the slot format.

In further other cases where the periodicity of monitoring of the slot format indication is larger than one slot, such as every two slots. If the (GC) PDCCH indicating the slot format contains one single slot format, the UE can apply the same slot format to a number of consecutive slots until the next monitoring occasion. Alternatively, the scheduling device 510 can indicate the slot formats for a number of consecutive slots from the current monitoring occasion to the next monitoring occasion at the same time. With this alternative scheme, different slot formats can be indicated for a number of consecutive slots between two monitoring occasions. Note that the alternative scheme is still referred to as "GC PDCCH indicating one slot format," in the sense that there is no individual slot format indicated for individual frequency applicable range. The case where individual frequency applicable range is associated with individual slot format will be addressed in the embodiment below labeled with "GC PDCCH indicating multiple slot formats."

Multiple Groups of Transceiver Devices

For instance, a single group common PDCCH addressing one group of transceiver devices is transmitted by the scheduling device 510 at a time. However, multiple (or more than one) transceiver device groups (or UE groups may also be addressed, using more than one respective GC PDCCH. Accordingly, respective group-common PDCCHs respectively indicate applicable frequency ranges and slot formats to be used by respective groups of transceiver devices.

Accordingly, in some embodiments, a first GC PDCCH indicates a first set of applicable frequency ranges and a first slot format in compliance with which the transmission is to be performed between the scheduling device and a first group of transceiver devices on the first set of applicable frequency ranges. A second GC PDCCH indicates a second set of applicable frequency ranges and a second slot format in compliance with which the transmission is to be performed between the scheduling device and a second group of transceiver devices on the second set of applicable frequency ranges. The first and second GC PDCCHs are transmitted by the scheduling device 510 to be received respectively by a first group and a second group of UEs/transceiver devices. In general, a plurality of GC PDCCHs are transmitted to a plurality of transceiver device groups. Therein, the first set of applicable frequency ranges and the second set of applicable frequency ranges (and possibly further sets of applicable frequency ranges) are non-overlapping. Non-overlapping means that a frequency range (sub-band) included in the first set of frequency ranges applicable to the first group is not included in the second set of applicable frequency ranges applicable to the second group. A set of frequency ranges comprised one or more applicable frequency ranges.

Figure 10:
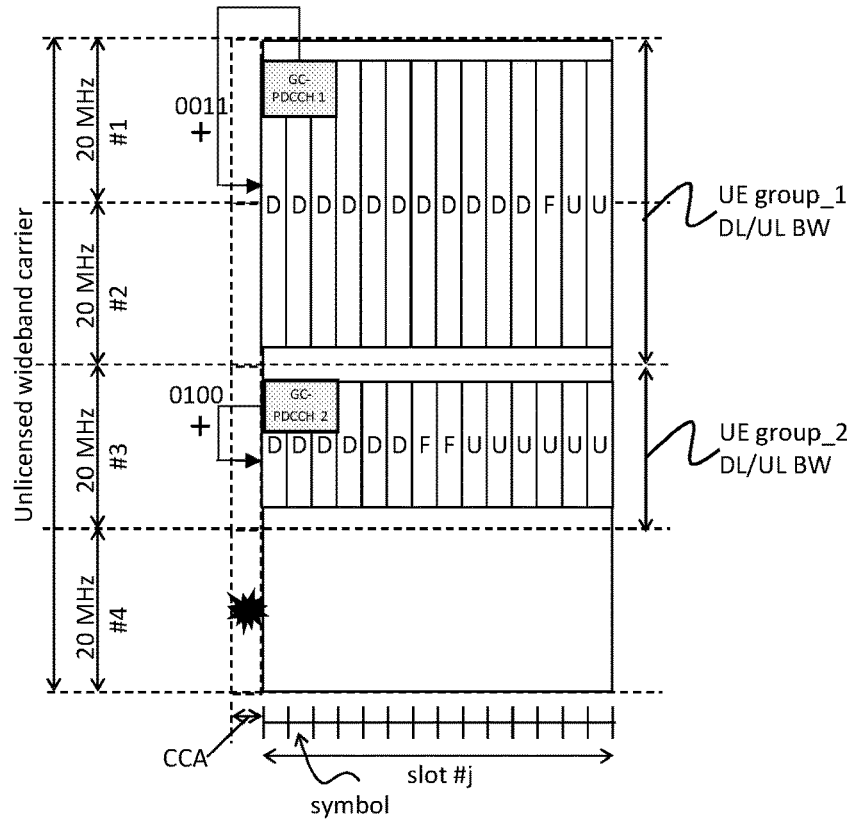
FIG. 10 is a diagram illustrating exemplary group-wise slot formats and applicable frequency ranges.

For example, as shown in FIG. 10, the gNB/scheduling device performs LBT and succeeds in determining frequency ranges #1, #2, and #3 as unused, but fails for frequency range #4 as it is used by another communication system. The gNB then determines an UL and downlink partitioning in frequency and time domain according to the traffic demand required by different UE groups. E.g., the UEs in group 1 may have more DL traffic demand than the UEs in group 2. Based on the determined UL and downlink partitioning of resources, the gNB determines a first GC PDCCH (GC PDCCH 1) and a second GC PDCCH (GC PDCCH 2). The gNB sends the GC PDCCH 1 to group 1, signaling a 40 MHz bandwidth ranging over sub-bands #1 and #2 (bitmap ("0011") and slot format "DDDDDDDDDDDFUU." The UEs in group 1 receive and decode GC PDCCH 1 and derive the resource usage (symbol types and frequency ranges) correspondingly. Likewise, the gNB sends GC PDCCH 2 to group 2, informing 20 MHz bandwidth (bitmap "0100") and a slot format, e.g., "DDDDDDFFUUUUUU." The UEs of group 2 receive and decode PDCCH 2 and derive the resource usage correspondingly. Like in the embodiments with a single group-common PDCCH, instead of bitmaps, indicators of starting position and length of the applicable frequency range may be used for contiguous sets of frequency ranges.

The UE groups may be differentiated by respectively different group common RNTIs for decoding the GC PDCCHs. For instance, the UEs a first group are configured with a first group-common RNTI for decoding the first GC PDCCH, and the UEs in group 2 are configured with a second group-common RNTI for decoding the second GC PDCCH.

Accordingly, providing flexibility in UL and DL indication may be facilitated by assigning UL and DL resources specifically to different UE groups and by dividing available bandwidth within an unlicensed carrier among plural UE groups in accordance with the traffic demand.

GC PDCCH Indicating Multiple Slot Formats

In the above embodiments labeled "GC PDCCH indicating one slot format" and "Multiple Groups of transceiver devices," a GC PDCCH indicates a single slot format (see the above embodiments for the meaning of a single slot format) for transmission in one or more frequency ranges indicated as applicable. In further embodiments, one GC PDCCH contains multiple slot formats, and each slot format corresponds to one frequency range.

Accordingly a plurality of slot formats is included in the GC PDCCH. An applicable frequency range is indicated by the inclusion of the corresponding slot format in the GC PDCCH. Moreover, implicitly, each sub-band slot format is interpreted to correspond to a frequency range of a given size, such as 20 MHz. For instance, an order in which a plurality of slot format indicators are provided in the PDCCH indicates to which frequency range a certain slot format (indication) corresponds.

In some embodiments, the PDCCH includes a plurality of fields indicating the plurality of slot formats in compliance with which the transmission is to be performed respectively in the plurality of frequency ranges.

For instance, a slot format is indicated in the PDCCH for each of the sub-bands of the unlicensed wideband carrier, irrespective of whether the wideband carrier is used by another (second) communication system or not and whether a transmission can be scheduled/configured to be performed over the subcarrier.

Accordingly, in case a frequency range from among the plurality of frequency ranges which is determined in the clear channel assessment to be currently used (and blocked) by the second communication system is identified in the clear channel assessment, the slot format corresponding to the blocked frequency range may be determined to be a distinctive slot format. For example, the slot format corresponding to a blocked frequency range may specify each symbol from among the plurality of symbols of the slot as flexible ("FFFFFFFFFFFFFF").

Figure 11:
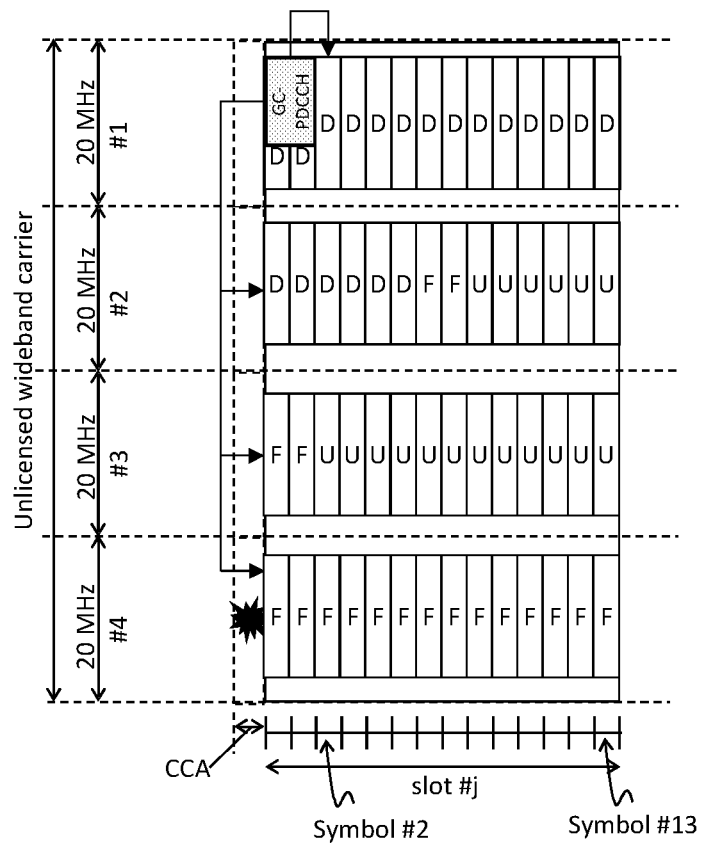
FIG. 11 is a diagram illustrating applicable frequency ranges and respective slot formats.

An example of one GC PDCCH indicating for each 20 MHz range respectively a slot format is shown in FIG. 11. As shown, the UL and DL bandwidth of a UE (or group of UEs) can be different in a given symbol. For instance, it can be seen that for semi-static or periodic transmission over Symbol #2, UE reception bandwidth (downlink) is 40 MHz (frequency range #1 and #2) and transmit bandwidth is 20 MHz (frequency range #3). It should be noted that guard band between DL and UL should not be used to carry data, in order to facilitate alleviating self-interference. For dynamic DL transmission over Symbol #2, the frequency domain resource allocation field may be interpreted over #1, #2, and #4 20 MHz sub-bands together (as they include DL and flexible symbols), or over whole active BWP (bandwidth part). For dynamic UL transmission over Symbol #2, the frequency domain resource allocation field may be interpreted over #3 and #4 20 MHz sub-band together, or over whole active BWP. Note that since flexible symbols are not allowed for semi-static or periodic transmission, it makes no difference from the UE point of view in terms of semi-static or periodic transmission whether the flexible symbol is blocked by other system or not. On the other hand, for the dynamic transmission, since it should always follow the dynamic scheduling decision of the scheduling device gNB, it is the responsibility of the scheduling device to guarantee that those flexible symbols should not be scheduled if those frequency range is blocked by other system.

If a UE is required to simultaneously receive and transmit over the same carrier, the UE should be provided with self-interference cancellation capability. However, similar to section "Multiple Groups of transceiver devices," different sub-bands may be allocated to different UE groups to relieve the self-interference cancellation requirement for the UE.

For instance, although for each frequency range a respective slot format is indicated in the GC PDCCH, a UE or UE group may be configured to evaluate only one or a subset of the slot formats and perform transmission only on the corresponding one frequency range or subset of frequency ranges.

Similar to what is described in section "GC PDCCH indicating one slot format," in case that the monitoring periodicity of slot format indication is larger than one slot, the scheduling device may indicate multiple slot formats (corresponding to the time domain for a number of consecutive slots), together with the multiple slot formats corresponding to the frequency domain applicable frequency range.

In accordance with above Table 2, semi-static or periodic DL transmission is allowed over the union of frequency range(s) containing downlink symbols (the frequency ranges in which one or more symbols are specified by the slot format as DL). Semi-static or periodic UL transmissions are allowed over the UL symbols within the union of frequency range(s) containing those UL symbols.

Moreover, in accordance with Table 3, for dynamic DL transmission, the frequency domain resource allocation field in the scheduling DCI is interpreted with respect to the union of frequency range(s) containing DL and flexible symbols, or the whole active DL bandwidth part (BWP), depending on the RRC configuration. Using the union of frequency range(s) containing DL and flexible symbols as the reference can reduce the size of resource allocation bit in scheduling DCI. On the other hand, using the active BWP as the reference is more robust because the resource allocation information does not depend on slot formation indication. For dynamic UL transmission, the frequency domain resource allocation field in the scheduling DCI is interpreted with respect to the union of frequency range(s) containing UL and flexible symbols, or the whole UL active BWP, similar to the DL counterpart.

It should be noted that case 2 from tables 2 and 3 does not occur in the embodiments with a (GC) PDCCH indicating multiple slot formats, because in these embodiments, the slot format only defines the symbols over its applicable frequency range of 20 MHz, and no explicit indication of a frequency range as "applicable" or "inapplicable" is provided.

Figure 12:
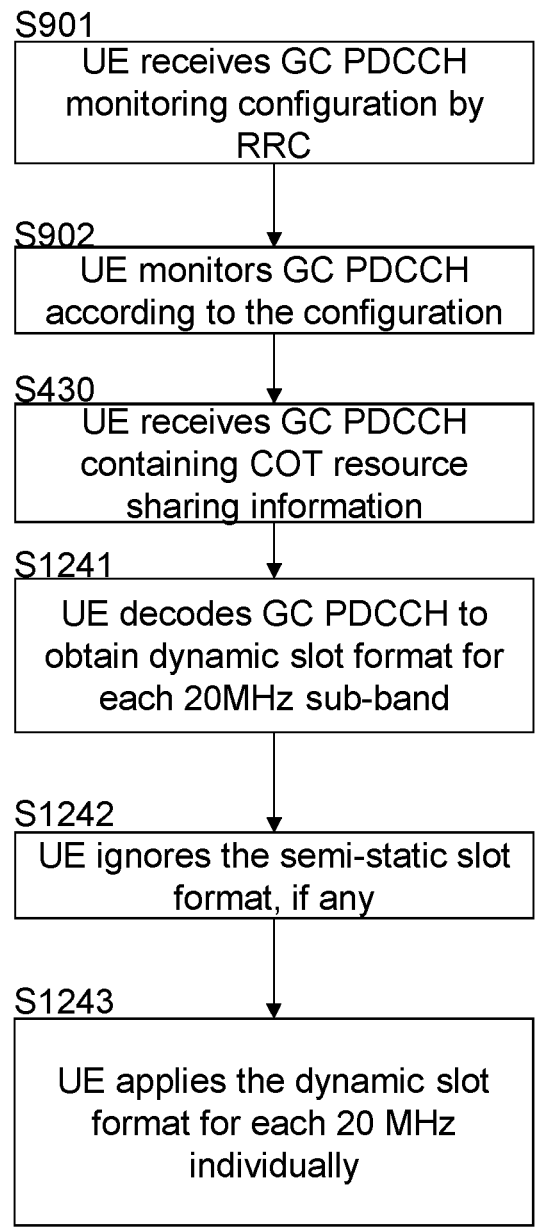
FIG. 12 is a flow chart showing exemplary for determining applicable frequency ranges and respective slot formats in a method for a UE.

In FIG. 12, method steps performed by a UE (or transceiver device 560) are shown. Steps S901, S902, and S430 are the same as the corresponding steps shown for the embodiments with single slot format indication in FIG. 9. The remaining steps are sub-steps of step S440 in the current embodiments. In step S1241, the UE decodes the GC PDCCH to obtain the dynamic slot format for each sub-band (e.g., 20 MHz range). In step S1242, the UE ignores the semi-static slot format, if any semi-static slot format has been provided. In step S1243, the UE applies the dynamic slot format for each (20 MHz) frequency range individually/respectively.

The semi-static slot format is ignored in step S1242 because if the same symbol is dynamically indicated as an uplink symbol and a downlink symbol in different frequency ranges, most semi-static indications (except flexible symbols) would lead to an error case in one of the frequency ranges. However, step S1242 is optional. For instance, the semi-static slot format could be interpreted as applying one of the indicated frequency ranges. Alternatively, in addition to the plurality of dynamic slot format indications, a plurality of semi-static slot format indications could be provided as well for the respective frequency ranges.

In the embodiments where the GC PDCCH indicates multiple slot formats for a plurality of sub-bands, the multiple "sub-band" slot formats enable one transceiver device or UE to be indicated different slot formats for different sub-bands (frequency ranges, e.g., 20 MHz) if the UE is capable of supporting full-duplex. Therefore more flexible spectrum utilization may be facilitated.

The present disclosure can be realized by software, hardware, or software in cooperation with hardware. Each functional block used in the description of each embodiment described above can be partly or entirely realized by an LSI (large scale integration) such as an integrated circuit (IC), and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

As described, provided are devices and methods enabling resource sharing between initiating and responding deices in NR unlicensed (or similar wireless communication systems operating in an unlicensed carrier).

Provided is a communication method for a transceiver device, comprising receiving a physical downlink control channel, PDCCH, indicating a frequency range which is included in a carrier and applicable for transmission to be performed between the transceiver device and a scheduling device and a slot format indicating a sequence of symbol types in compliance with which the transmission is to be performed on a plurality of symbols included in a slot on the frequency range, the symbol types including at least one of an uplink symbol type, a downlink symbol type, and a flexible symbol type, determining, based on the received PDCCH, the frequency range and the slot format and performing the transmission on the determined frequency range in compliance with the determined slot format.

In some embodiments, the PDCCH includes a first field indicating the frequency range and a second field indicating the slot format.

For instance, the first field is a bitmap including a plurality of bits respectively corresponding to a plurality of ranges included in the carrier and including said frequency range, and the bitmap indicates whether or not a range from among the plurality of ranges is applicable for the transmission.

In some embodiments, the frequency range is included in a contiguous set of applicable frequency ranges and the first field indicates a starting position of the contiguous set of applicable frequency ranges and a length of the contiguous set of applicable frequency ranges.

In some embodiments, a plurality of frequency ranges including said frequency range is included in the carrier and applicable for the transmission to be performed between the transceiver device and the scheduling device, and the PDCCH includes a plurality of fields indicating a plurality of slot formats in compliance with which the transmission is to be performed respectively in the plurality of frequency ranges.

For instance, the carrier is an unlicensed carrier.

For example, the PDCCH is a group common PDCCH which is received by a group of transceiver devices including said transceiver device.

In some embodiments, the slot format indicated by the PDCCH is a dynamic slot format, and the communication method includes receiving RRC signaling including a configured slot format, wherein, in case the configured slot format specifies a symbol in the slot as flexible, the dynamic slot format specifies said symbol as flexible, uplink, or downlink.

For example, the transmission includes at least one of periodic uplink transmission performed on a symbol specified by the slot format indicated by the PDCCH as uplink, periodic downlink transmission performed on a symbol specified by the slot format indicated by the PDCCH as downlink, semi-statically configured uplink transmission performed on a symbol specified by the slot format indicated by the PDCCH as uplink, semi-statically configured downlink transmission performed on a symbol specified by the slot format indicated by the PDCCH as downlink, dynamic uplink transmission performed on a symbol specified by the slot format indicated by the PDCCH as uplink or flexible, and dynamic downlink transmission performed on a symbol specified by the slot format indicated by the PDCCH as downlink or flexible.

Further provided is a communication method for a scheduling device comprising determining a physical downlink control channel, PDCCH, indicating a frequency range which is included in a carrier and applicable for transmission to be performed between the scheduling device and a transceiver device and a slot format indicating a sequence of symbol types in compliance with which the transmission is to be performed on a plurality of symbols included in a slot on the frequency range, the symbol types including at least one of an uplink symbol type, a downlink symbol type, and a flexible symbol type, transmitting the PDCCH, scheduling and performing the transmission on the frequency range indicated by the PDCCH in compliance with the slot format indicated by the PDCCH.

For instance, the carrier is an unlicensed carrier shared by a first communication system including the scheduling device and the transceiver device and a second communication system, and the communication method includes performing clear channel assessment to determine an unused frequency range currently unused by the second communication system, and determining the PDCCH based on the result of the clear channel assessment.

For example, the PDCCH is a group common PDCCH which is transmitted to a group of transceiver devices including said transceiver device.

In some embodiments, the PDCCH is a first group-common PDCCH which indicates a first set of applicable frequency ranges including said frequency range and a first slot format in compliance with which the transmission is to be performed between the scheduling device and a first group of transceiver devices including said transceiver device on the first set of applicable frequency ranges, and the communication method includes transmitting a second group-common PDCCH indicating a second set of applicable frequency ranges and a second slot format in compliance with which the transmission is to be performed between the scheduling device and a second group of transceiver devices on the second set of applicable frequency ranges, wherein the first set of applicable frequency ranges and the second set of applicable frequency ranges are non-overlapping.

In some embodiments, the PDCCH includes a first field indicating the frequency range and a second field indicating the slot format.

For instance, the first field is a bitmap including a plurality of bits respectively corresponding to a plurality of ranges included in the carrier and including said frequency range, and the bitmap indicates whether or not a range from among the plurality of ranges is applicable for the transmission.

For instance, the frequency range is included in a contiguous set of applicable frequency ranges and the first field indicates a starting position of the contiguous set of applicable frequency ranges and a length of the contiguous set of applicable frequency ranges.

In some embodiments, a plurality of frequency ranges including said frequency range is included in the carrier and applicable for the transmission to be performed between the transceiver device and the scheduling device, and the PDCCH includes a plurality of fields indicating a plurality of slot formats in compliance with which the transmission is to be performed respectively in the plurality of frequency ranges.

For example, said frequency range is included in a plurality of frequency ranges, said slot format is included in a plurality of slot formats, the PDCCH includes a plurality of fields indicating the plurality of slot formats in compliance with which the transmission is to be performed respectively in the plurality of frequency ranges, and in case a used frequency range from among the plurality of frequency ranges which is determined in the clear channel assessment to be currently used by the second communication system is identified in the clear channel assessment, the slot format corresponding to the used frequency range is determined to specify each symbol from among the plurality of symbols as flexible.

For example, the slot format indicated by the PDCCH is a dynamic slot format, and the communication method includes transmitting RRC signaling including a configured slot format, wherein in case the configured slot format specifies a symbol in the slot as flexible, the dynamic slot format specifies said symbol as flexible, uplink, or downlink.

For instance, the transmission includes at least one of periodic uplink transmission performed on a symbol specified by the slot format indicated by the PDCCH as uplink, periodic downlink transmission performed on a symbol specified by the slot format indicated by the PDCCH as downlink, semi-statically configured uplink transmission performed on a symbol specified by the slot format indicated by the PDCCH as uplink, semi-statically configured downlink transmission performed on a symbol specified by the slot format indicated by the PDCCH as downlink, dynamic uplink transmission performed on a symbol specified by the slot format indicated by the PDCCH as uplink or flexible, and dynamic downlink transmission performed on a symbol specified by the slot format indicated by the PDCCH as downlink or flexible.

Further provided is a transceiver which, in operation, receives a physical downlink control channel, PDCCH, indicating a frequency range which is included in a carrier and applicable for transmission to be performed between the transceiver device and a scheduling device and a slot format indicating a sequence of symbol types in compliance with which the transmission is to be performed on a plurality of symbols included in a slot on the frequency range, the symbol types including at least one of an uplink symbol type, a downlink symbol type, and a flexible symbol type, and circuitry which, in operation, determines, based on the received PDCCH, the frequency range and the slot format, wherein the transceiver, in operation, performs the transmission on the determined frequency range in compliance with the determined slot format.

In some embodiments, the PDCCH includes a first field indicating the frequency range and a second field indicating the slot format.

For example, the first field is a bitmap including a plurality of bits respectively corresponding to a plurality of ranges included in the carrier and including said frequency range, and the bitmap indicates whether or not a range from among the plurality of ranges is applicable for the transmission.

For example, the frequency range is included in a contiguous set of applicable frequency ranges and the first field indicates a starting position of the contiguous set of applicable frequency ranges and a length of the contiguous set of applicable frequency ranges.

In some embodiments, a plurality of frequency ranges including said frequency range is included in the carrier and applicable for the transmission to be performed between the transceiver device and the scheduling device, and the PDCCH includes a plurality of fields indicating a plurality of slot formats in compliance with which the transmission is to be performed respectively in the plurality of frequency ranges.

For instance, the carrier is an unlicensed carrier.

For example, the PDCCH is a group common PDCCH which is received by a group of transceiver devices including said transceiver device.

In some embodiments, the slot format indicated by the PDCCH is a dynamic slot format, and the transceiver, in operation, receives RRC signaling including a configured slot format, wherein in case the configured slot format specifies a symbol in the slot as flexible, the dynamic slot format specifies said symbol as flexible, uplink, or downlink.

For instance, transmission includes at least one of periodic uplink transmission performed on a symbol specified by the slot format indicated by the PDCCH as uplink, periodic downlink transmission performed on a symbol specified by the slot format indicated by the PDCCH as downlink, semi-statically configured uplink transmission performed on a symbol specified by the slot format indicated by the PDCCH as uplink, semi-statically configured downlink transmission performed on a symbol specified by the slot format indicated by the PDCCH as downlink, dynamic uplink transmission performed on a symbol specified by the slot format indicated by the PDCCH as uplink or flexible, and dynamic downlink transmission performed on a symbol specified by the slot format indicated by the PDCCH as downlink or flexible.

Further provided is a scheduling device comprising circuitry which, in operation, determines a physical downlink control channel, PDCCH, indicating a frequency range which is included in a carrier and applicable for transmission to be performed between the scheduling device and a transceiver device and a slot format indicating a sequence of symbol types in compliance with which the transmission is to be performed on a plurality of symbols included in a slot on the frequency range, the symbol types including at least one of an uplink symbol type, a downlink symbol type, and a flexible symbol type, the scheduling device comprising a transceiver which, in operation, transmits the PDCCH wherein the circuitry, in operation, schedules the transmission and the transceiver, in operation, performs the transmission on the frequency range indicated by the PDCCH in compliance with the slot format indicated by the PDCCH.

For instance, the carrier is an unlicensed carrier shared by a first communication system including the scheduling device and the transceiver device and a second communication system, and the transceiver, in operation, performs clear channel assessment to determine an unused frequency range currently unused by the second communication system, and determining the PDCCH based on the result of the clear channel assessment.

For instance, the PDCCH is a group common PDCCH which is transmitted to a group of transceiver devices including said transceiver device.

In some embodiments, the PDCCH is a first group-common PDCCH which indicates a first set of applicable frequency ranges including said frequency range and a first slot format in compliance with which the transmission is to be performed between the scheduling device and a first group of transceiver devices including said transceiver device on the first set of applicable frequency ranges, and the transceiver, in operation, transmits a second group-common PDCCH indicating a second set of applicable frequency ranges and a second slot format in compliance with which the transmission is to be performed between the scheduling device and a second group of transceiver devices on the second set of applicable frequency ranges, wherein the first set of applicable frequency ranges and the second set of applicable frequency ranges are non-overlapping.

For example, the PDCCH includes a first field indicating the frequency range and a second field indicating the slot format.

For instance, the first field is a bitmap including a plurality of bits respectively corresponding to a plurality of ranges included in the carrier and including said frequency range, and the bitmap indicates whether or not a range from among the plurality of ranges is applicable for the transmission.

In some embodiments, the frequency range is included in a contiguous set of applicable frequency ranges and the first field indicates a starting position of the contiguous set of applicable frequency ranges and a length of the contiguous set of applicable frequency ranges.

In some embodiments, a plurality of frequency ranges including said frequency range is included in the carrier and applicable for the transmission to be performed between the transceiver device and the scheduling device, and the PDCCH includes a plurality of fields indicating a plurality of slot formats in compliance with which the transmission is to be performed respectively in the plurality of frequency ranges.

For instance, said frequency range is included in a plurality of frequency ranges, said slot format is included in a plurality of slot formats, and the PDCCH includes a plurality of fields indicating the plurality of slot formats in compliance with which the transmission is to be performed respectively in the plurality of frequency ranges in case a used frequency range from among the plurality of frequency ranges which is determined in the clear channel assessment to be currently used by the second communication system is identified in the clear channel assessment, the slot format corresponding to the used frequency range is determined to specify each symbol from among the plurality of symbols as flexible.

For example, a plurality of frequency ranges including said frequency range is included in the carrier and applicable for the transmission to be performed between the transceiver device and the scheduling device, and the PDCCH includes a plurality of fields indicating a plurality of slot formats in compliance with which the transmission is to be performed respectively in the plurality of frequency ranges.

For instance, the slot format indicated by the PDCCH is a dynamic slot format, and the transceiver, in operation, transmits RRC signaling including a configured slot format, wherein, in case the configured slot format specifies a symbol in the slot as flexible, the dynamic slot format specifies said symbol as flexible, uplink, or downlink.

For example, the transmission includes at least one of periodic uplink transmission performed on a symbol specified by the slot format indicated by the PDCCH as uplink, periodic downlink transmission performed on a symbol specified by the slot format indicated by the PDCCH as downlink, semi-statically configured uplink transmission performed on a symbol specified by the slot format indicated by the PDCCH as uplink, semi-statically configured downlink transmission performed on a symbol specified by the slot format indicated by the PDCCH as downlink, dynamic uplink transmission performed on a symbol specified by the slot format indicated by the PDCCH as uplink or flexible, and dynamic downlink transmission performed on a symbol specified by the slot format indicated by the PDCCH as downlink or flexible.

Summarizing, the present disclosure provides a transceiver device, a scheduling device, and communication methods for transceiver device and scheduling device. The transceiver device comprises a transceiver which, in operation, receives a physical downlink control channel (PDCCH), indicating an applicable frequency range included in a carrier and applicable for transmission to be performed between the transceiver device and a scheduling device and a slot format indicating a sequence of symbol types by which the transmission is to be performed on a plurality of symbols included in a slot on the applicable frequency range, the symbol types including at least one of an uplink symbol type, a downlink symbol type, and a flexible symbol type, and circuitry which, in operation, determines, based on the PDCCH, the applicable frequency range and the slot format. The transceiver, in operation, performs the transmission on the determined applicable frequency range in compliance with the slot format.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication apparatus, comprising:
 a transceiver, which, in operation, receives a physical downlink control channel (PDCCH) indicating
  a frequency range which is included in an unlicensed carrier and applicable for reception to be performed between the communication apparatus and a scheduler, wherein the unlicensed carrier is shared between a first communication system, which includes the communication apparatus and the scheduler, and a second communication system, and the frequency range is currently unused by the second communication system as determined based on a result of clear channel assessment performed by the scheduler; and
  a slot format indicating a sequence of symbol types, in compliance with which the reception is to be performed on a plurality of symbols included in a slot, the symbol types including at least one of an uplink symbol type, a downlink symbol type, and a flexible symbol type; and
 circuitry, which, in operation,
 determines, based on the received PDCCH, the frequency range and the slot format; and
 performs the reception on the determined frequency range in compliance with the determined slot format,
 wherein the PDCCH includes a first field indicating the frequency range and a second field indicating the slot format,
 wherein the first field is a bitmap including a plurality of bits respectively indicating whether or not a plurality of frequency ranges including the frequency range are applicable for the reception, and wherein the second field indicates the slot format for a number of consecutive slots, and the frequency range indicated by the first field as currently unused by the second communication system based on the result of clear channel assessment is applicable for the reception in the number of consecutive slots.

2. The communication apparatus according to claim 1, wherein the frequency range is included in a contiguous set of applicable frequency ranges and the first field indicates a starting position of the contiguous set of applicable frequency ranges and a length of the contiguous set of applicable frequency ranges.

3. The communication apparatus according to claim 1, wherein the plurality of frequency ranges including the frequency range are applicable for the reception to be performed between the communication apparatus and the scheduler, and the PDCCH includes a plurality of second fields indicating a plurality of slot formats, in compliance with which the reception is to be performed respectively in the plurality of frequency ranges.

4. The communication apparatus according to claim 1, wherein the slot format indicated by the PDCCH is a dynamic slot format, and the transceiver, in operation, receives Radio Resource Control (RRC) signaling including a configured slot format, wherein, in case the configured slot format specifies a symbol in the slot as flexible, the dynamic slot format specifies the symbol as flexible, uplink, or downlink.

5. The communication apparatus according to claim 1, wherein the transceiver performs at least one of periodic uplink transmission performed on a symbol specified by the slot format indicated by the PDCCH as uplink, periodic downlink transmission performed on a symbol specified by the slot format indicated by the PDCCH as downlink, semi-statically configured uplink transmission performed on a symbol specified by the slot format indicated by the PDCCH as uplink, semi-statically configured downlink transmission performed on a symbol specified by the slot format indicated by the PDCCH as downlink, dynamic uplink transmission performed on a symbol specified by the slot format indicated by the PDCCH as uplink or flexible, or dynamic downlink transmission performed on a symbol specified by the slot format indicated by the PDCCH as downlink or flexible.

6. A communication method for a communication apparatus, comprising:

receiving a physical downlink control channel (PDCCH) indicating a frequency range which is included in an unlicensed carrier and applicable for reception to be performed between the communication apparatus and a scheduler, wherein the unlicensed carrier is shared between a first communication system, which includes the communication apparatus and the scheduler, and a second communication system, and the frequency range is currently unused by the second communication system as determined based on a result of clear channel assessment performed by the scheduler; and a slot format indicating a sequence of symbol types, in compliance with which the reception is to be performed on a plurality of symbols included in a slot, the symbol types including at least one of an uplink symbol type, a downlink symbol type, and a flexible symbol type;

determining, based on the received PDCCH, the frequency range and the slot format; and performing the reception on the determined frequency range in compliance with the determined slot format, wherein the PDCCH includes a first field indicating the frequency range and a second field indicating the slot format, wherein the first field is a bitmap including a plurality of bits respectively indicating whether or not a plurality of frequency ranges including the frequency range are applicable for the reception, and wherein the second field indicates the slot format for a number of consecutive slots, and the frequency range indicated by the first field as currently unused by the second communication system based on the result of clear channel assessment is applicable for the reception in the number of consecutive slots.

* * * * *